United States Patent
Oh et al.

(10) Patent No.: US 10,787,059 B2
(45) Date of Patent: Sep. 29, 2020

(54) COOLANT HEATING DEVICE FOR VEHICLE

(71) Applicants: HYUNDAI MOTOR COMPANY, Seoul (KR); KIA MOTORS CORPORATION, Seoul (KR)

(72) Inventors: Man Ju Oh, Yongin-si (KR); Sang Shin Lee, Suwon-si (KR); So La Chung, Seoul (KR); Jae Woong Kim, Hwaseong-si (KR); So Yoon Park, Suwon-si (KR); Jae Woo Park, Ansan-si (KR); Chul Min Kim, Asan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 295 days.

(21) Appl. No.: 15/816,445

(22) Filed: Nov. 17, 2017

(65) Prior Publication Data

US 2019/0070931 A1    Mar. 7, 2019

(30) Foreign Application Priority Data

Sep. 5, 2017    (KR) .......................... 10-2017-0113073

(51) Int. Cl.
  *B60H 1/22*    (2006.01)
  *F24H 1/00*    (2006.01)
  *F24H 9/20*    (2006.01)
  *F01P 11/16*   (2006.01)

(52) U.S. Cl.
  CPC ............ *B60H 1/2221* (2013.01); *F01P 11/16* (2013.01); *F24H 1/009* (2013.01); *F24H 1/0018* (2013.01); *F24H 9/2021* (2013.01); *B60H 2001/2256* (2013.01); *F01P 2025/70* (2013.01); *F01P 2070/04* (2013.01); *F24D 2220/048* (2013.01)

(58) Field of Classification Search
  CPC .... F01P 11/16; F01P 2070/04; F01P 2025/70; F24H 1/0018; F24H 1/009; F24H 9/2021; F24H 9/2007; F24D 2220/048; B60H 2001/2256
  USPC ..... 219/208, 200; 222/64–68, 51, 69, 146.1; 392/465, 499; 60/268, 230
  See application file for complete search history.

(56) References Cited

U.S. PATENT DOCUMENTS

| | | | |
|---|---|---|---|
| 1,304,195 A * | 5/1919 | Noeth ................... | F23N 1/087 137/94 |
| 4,982,655 A * | 1/1991 | Wen-Der ............... | A47J 31/56 116/109 |
| 6,820,502 B2 | 11/2004 | Jiang et al. | |
| 7,330,645 B2 * | 2/2008 | Kwon .................... | F24H 1/121 392/456 |
| 9,151,736 B2 * | 10/2015 | Frivik ................... | F01N 3/208 |

(Continued)

*Primary Examiner* — Lien M Ngo
(74) *Attorney, Agent, or Firm* — Morgan, Lewis & Bockius LLP

(57) ABSTRACT

A coolant heating device for a vehicle includes: a housing storing coolant therein and having a sheath heater therein; an upper space part protruding upwards from a top surface of the housing and having an inner space via which an inner space of the housing communicates with the upper space part; a water-level-sensing part disposed inside the upper space part to sense a level of coolant in the housing; and a controller for controlling operation of the sheath heater based on the level of coolant sensed by the water-level-sensing part.

7 Claims, 5 Drawing Sheets

(56) References Cited

U.S. PATENT DOCUMENTS

| | | | | |
|---|---|---|---|---|
| 9,297,686 B1* | 3/2016 | Ross, Jr. | ............... | G01F 23/292 |
| 9,328,940 B2* | 5/2016 | Satoh | ..................... | H02H 5/047 |
| 9,441,874 B2* | 9/2016 | Bird | ....................... | F25D 23/12 |
| 9,732,653 B2* | 8/2017 | Ogawa | .................... | F01N 3/208 |
| 9,816,758 B2* | 11/2017 | Gismervik | ............ | F01N 3/2066 |
| 2010/0162690 A1* | 7/2010 | Hosaka | ................. | F01N 3/2066 |
| | | | | 60/295 |
| 2012/0102981 A1* | 5/2012 | Klein | ................... | F25B 49/043 |
| | | | | 62/56 |

\* cited by examiner

[FIG. 1]
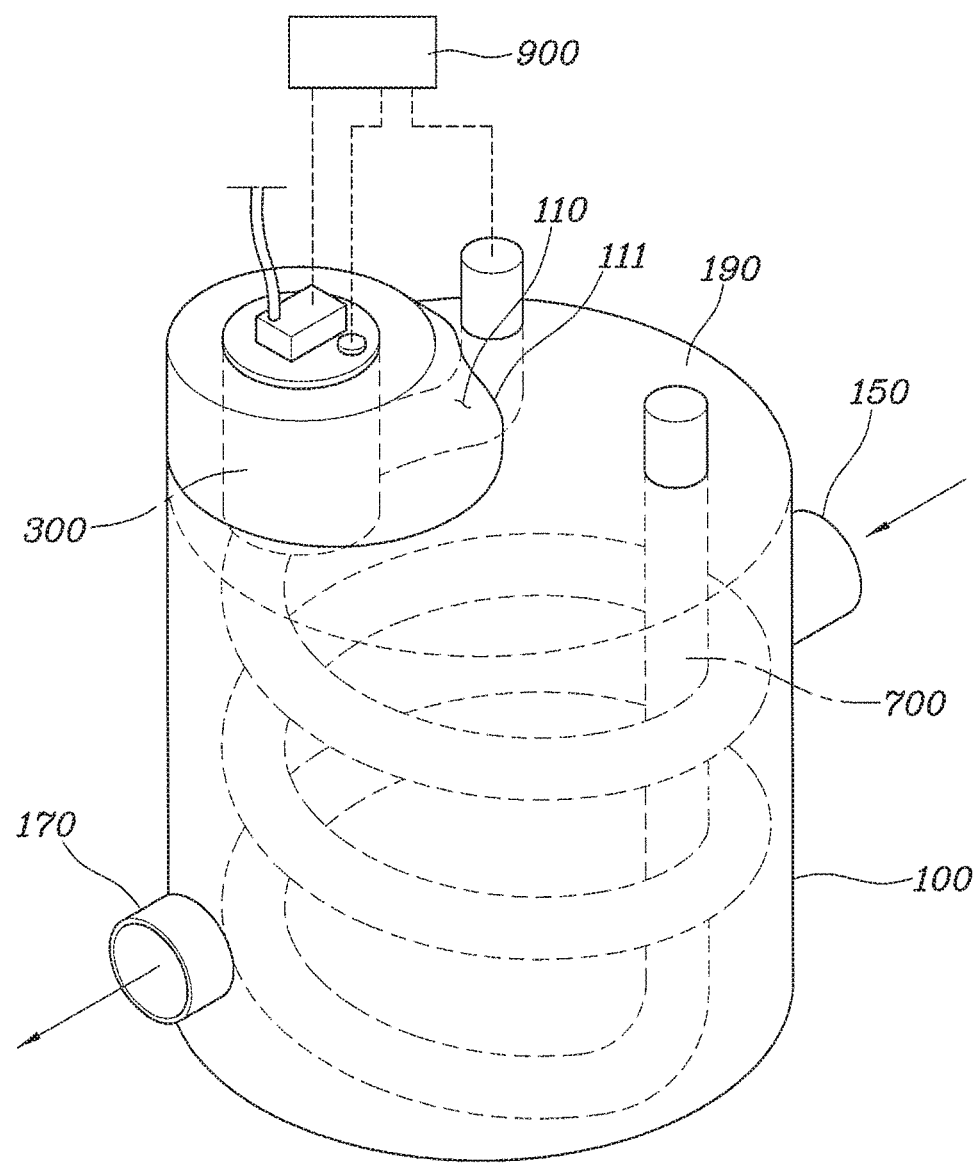

[FIG. 2]
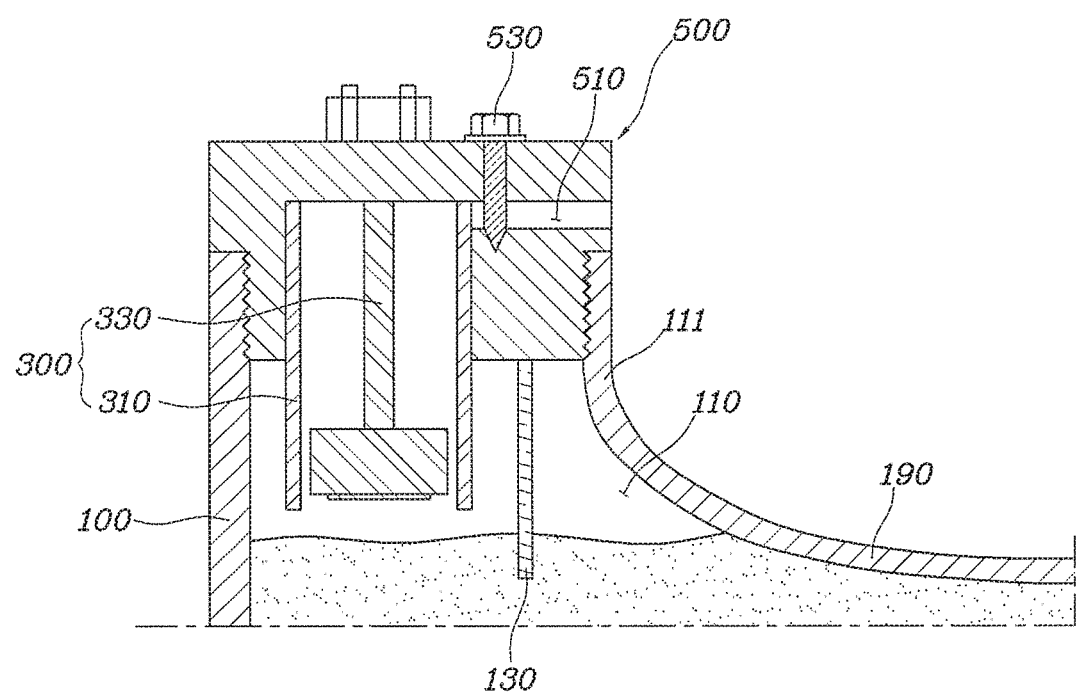

[FIG. 3]
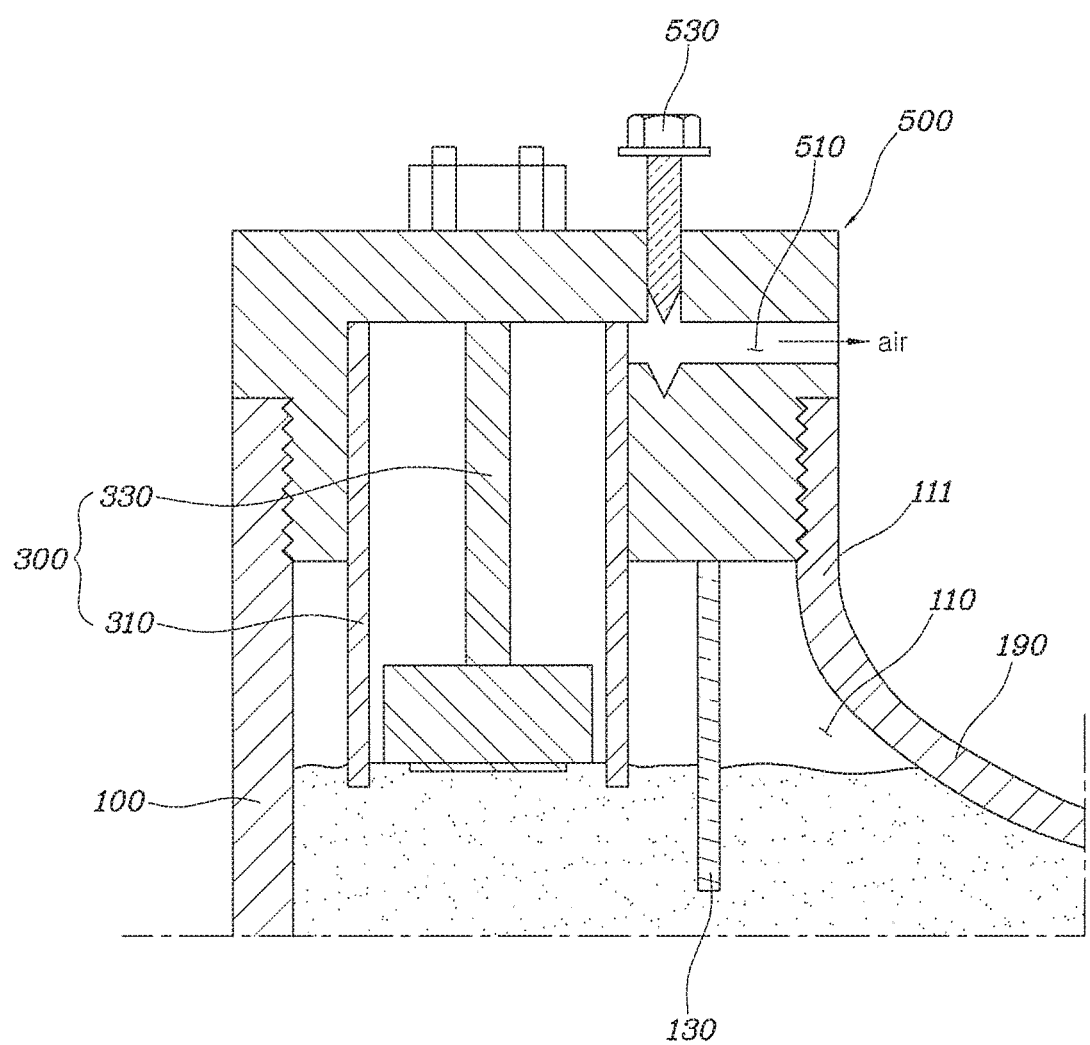

[FIG. 4]
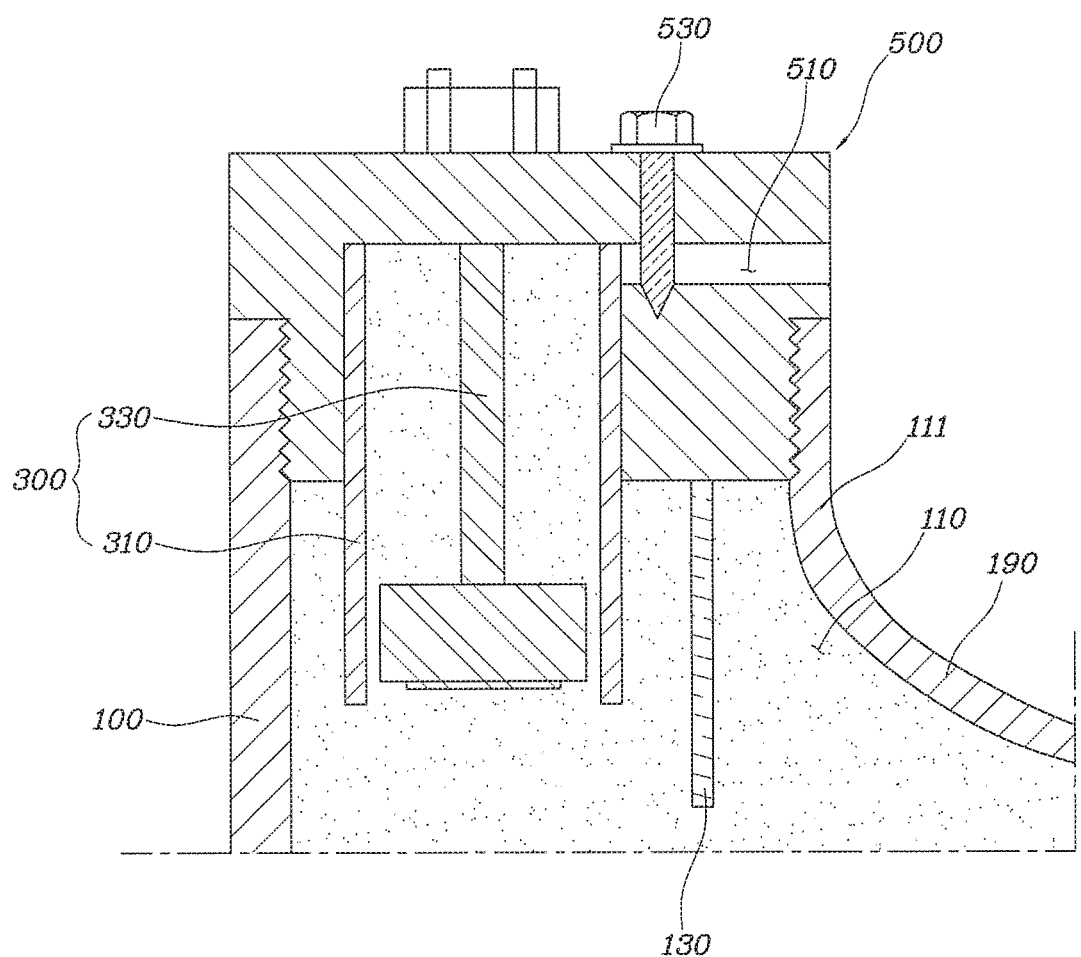

[FIG. 5]
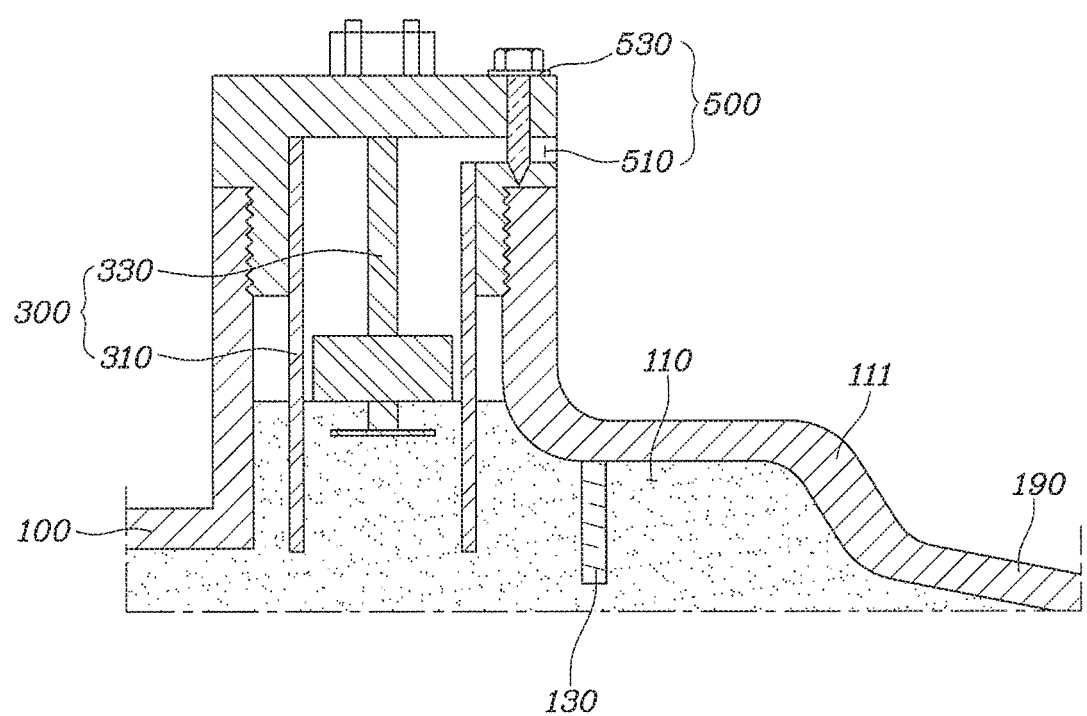

COOLANT HEATING DEVICE FOR VEHICLE

CROSS-REFERENCE TO RELATED APPLICATION

This application claims the benefit of priority to Korean Patent Application No. 10-2017-0113073, filed on Sep. 5, 2017, in the Korean Intellectual Property Office, the disclosure which is incorporated herein by reference.

TECHNICAL FIELD

The present disclosure relates to a sheath heater for heating coolant for a vehicle, and more particularly, to a coolant heating device for a vehicle, which may prevent a reduction in heat transfer due to exposure of a heat-emitting portion of a sheath heater to air rather than to water.

BACKGROUND

Recently, with the development of technologies related to eco-friendly apparatuses and the depletion of energy resources, interest in electric vehicles has increased. An electric vehicle is driven by a motor, which outputs power using electric energy supplied from a battery. Because such an electric vehicle is advantageous in that it emits no carbon dioxide and produces less noise and in that the motor provides higher energy efficiency than an engine, the electric vehicle is receiving attention as an eco-friendly vehicle.

However, unlike a conventional internal combustion engine vehicle, in which coolant is heated by heat generated from an engine, an electric vehicle has a shortcoming in that coolant cannot be heated by heat generated from an engine because there is no engine.

Therefore, an electric vehicle needs to be equipped with a separate device for heating coolant. However, in the case in which air is generated in a coolant housing, at which a sheath heater is provided, a heat-emitting portion of the sheath heater may be exposed to air, rather than to water, leading to a reduction in heat transfer and an increase in the temperature of the heat-emitting portion of the sheath heater, consequently causing damage to the sheath heater.

The information disclosed in this Background of the Invention section is only for enhancement of understanding of the general background of the invention and should not be taken as an acknowledgement or any form of suggestion that this information forms the prior art already known to a person skilled in the art.

SUMMARY

The present disclosure has been made in view of the above problems, and it is an object of the present disclosure to provide a coolant heating device for vehicle, which may prevent overheating of a sheath heater by collecting air, which is generated in a coolant housing, at which the sheath heater is provided, and discharging the collected air outside.

In accordance with an exemplary embodiment of the present disclosure, a coolant heating device for a vehicle includes: a housing storing coolant therein and having a sheath heater therein; an upper space part protruding upwards from a top surface of the housing and having an inner space communicating with an inner space of the housing; a water-level-sensing part disposed inside the upper space part to sense a level of coolant in the housing; and a controller for controlling the operation of the sheath heater based on the level of coolant sensed by the water-level-sensing part.

The water-level-sensing part may include a water level sensor for sensing the level of coolant in the housing and a guide bar extending downwards from the top surface of the upper space part to guide upward/downward movement of the water level sensor and to prevent incorrect detection by the water level sensor due to sloshing of coolant in the housing.

The coolant heating device may further include partition wall extending downwards from a top surface of the upper space part toward a region between the water-level-sensing part and the housing, and the partition wall may prevent incorrect detection by the water level sensor due to sloshing of coolant in the housing.

The upper space part may have a side surface connecting the top surface of the upper space part to the top surface of the housing, and the side surface may have a slope formed such that the cross-sectional area of the upper space part gradually increases in the downward direction, whereby the effective area of the housing in which air is collected may be increased.

The upper space part may be provided at the top thereof with an air discharge part, which is configured to be opened or closed so as to communicate with the outside, in order to discharge air collected in the upper space part to the outside.

The upper space part may have a discharge passage formed in the top thereof and extending laterally to enable the upper space part to communicate with the outside and a blocking member located in the discharge passage to selectively open or close the discharge passage, and the blocking member may be controlled by the controller so as to selectively open or close the discharge passage so that air collected in the upper space part is discharged outside through the discharge passage.

When a water pump operates, the blocking member may be controlled by the controller so as to open the discharge passage so that air in the upper space part is discharged outside through the discharge passage.

When the level of coolant sensed by the water-level-sensing part exceeds a predetermined level, the controller may turn on the sheath heater, and when the level of coolant sensed by the water-level-sensing part is equal to or lower than the predetermined level, the controller may turn off the sheath heater or may perform control such that an alarm signal is output.

When the area of the sheath heater that is exposed to air exceeds a predetermined level, the controller may turn off the sheath heater or may perform control such that an alarm signal is output, in order to prevent overheating of the sheath heater.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a view illustrating a coolant heating device for a vehicle according to one exemplary embodiment of the present disclosure;

FIG. 2 is a view of an upper space part shown in FIG. 1;

FIG. 3 and FIG. 4 are views showing the air-discharging operation of the coolant heating device for a vehicle according to the embodiment of the present disclosure; and FIG. 5 is a view illustrating a coolant heating device for a vehicle according to another exemplary embodiment of the present disclosure.

DETAILED DESCRIPTION

Reference will now be made in detail to the exemplary embodiments of the present disclosure, examples of which are illustrated in the accompanying drawings. Wherever possible, the same reference numbers will be used throughout the drawings to refer to the same or like parts.

FIG. 1 is a view illustrating a coolant heating device for a vehicle according to one exemplary embodiment of the present disclosure. FIG. 2 is a view of an upper space part shown in FIG. 1. FIG. 3 and FIG. 4 are views showing the air-discharging operation of the coolant heating device for a vehicle according to the embodiment of the present disclosure. FIG. 5 is a view illustrating a coolant heating device for a vehicle according to another exemplary embodiment of the present disclosure.

A coolant heating device for a vehicle according to one embodiment of the present disclosure includes: a housing 100, in which coolant is stored and to which a sheath heater 700 is mounted; an upper space part 110, which protrudes upwards from the top surface 190 of the housing 100 and has an inner space formed therein so as to communicate with the inner space in the housing 100; a water-level-sensing part 300, which is provided inside the upper space part 110 to sense the level of the coolant in the housing 100; and a controller 900, which controls the operation of the sheath heater 700 based on the level of the coolant sensed by the water-level-sensing part 300.

The housing 100 has the sheath heater 700. In addition, the housing 100 has an inlet port 150, through which the coolant flows into the housing 100, and an outlet port 170, through which the coolant heated by the sheath heater 700 is discharged outside. The inlet port 150 may be located at the upper portion of the housing 100, and the outlet port 170 may be located at a portion of the housing 100 that is lower than the position of the inlet port 150.

The upper space part 110 is formed at the housing 100 such that it protrudes upwards from the top surface 190 of the housing 100 and has an inner space formed therein so as to communicate with the inner space in the housing 100. As shown in FIG. 1, the side surface of the upper space part 110, which connects the top surface of the upper space part 110 to the top surface 190 of the housing 100, has a slope 111 formed such that the cross-sectional area of the upper space part 110 gradually increases from top to bottom. The reason for this is to increase the effective area of the housing 100, in which air is collected, and consequently to more efficiently collect air in the housing 100. Alternatively, as shown in FIG. 5, the side surface of the upper space part 110, which connects the top surface of the upper space part 110 to the top surface 190 of the housing 100, has a slope 111, which is slanted more gently than the slope 111 shown in FIG. 1 such that the cross-sectional area of the upper space part 110 gradually increases from the middle to the bottom, whereby the effective area of the housing 100, in which air is collected, increases.

The water-level-sensing part 300 is provided inside the upper space part 110 to sense the level of the coolant in the housing 100. The water-level-sensing part 300 includes a water level sensor 330, which senses the level of coolant in the housing 100, and a guide bar 310, which extends downwards from the top surface of the upper space part 110 to guide the upward/downward movement of the water level sensor 330. The water level sensor 330 may be configured as a sensor using buoyancy. The guide bar 310 is formed so as to surround the periphery of the water level sensor 330, thereby preventing incorrect detection by the water level sensor 330 due to sloshing of the coolant in the housing 100. In addition, a partition wall 130 is formed so as to extend downwards from the top surface of the upper space part 110 toward a region between the water-level-sensing part 300 and the housing 100. The partition wall 130 also functions to prevent incorrect detection by the water level sensor 330 due to sloshing of the coolant in the housing 100.

In addition, an air discharge part 500 is mounted to the top of the upper space part 110. The air discharge part 500 is configured to be opened or closed so as to communicate with the outside in order to discharge air, collected in the upper space part 110, outside. The air discharge part 500 includes a discharge passage 510, which communicates with the outside, and a blocking member 530, which selectively opens or closes the discharge passage 510. The discharge passage 510 is located at the top of the upper space part 110 and extends laterally so as to enable the upper space part 110 to communicate with the outside. The blocking member 530 is located in the discharge passage 510 and is controlled by the controller 900 so as to selectively open or close the discharge passage 510. Therefore, the air collected in the upper space part 110 is discharged outside through the discharge passage 510, which is selectively opened or closed by the controller 900. In particular, when a water pump (not shown) operates, the blocking member 530 is controlled by the controller 900 so as to open the discharge passage 510, whereby air in the upper space part 110 is discharged outside through the discharge passage 510.

The controller 900 controls the operation of the sheath heater 700 and the operation of the blocking member 530 based on the level of the coolant sensed by the water-level-sensing part 300. When the level of the coolant sensed by the water-level-sensing part 300 exceeds a predetermined level, the controller 900 turns on the sheath heater 700. In contrast, when the level of the coolant sensed by the water-level-sensing part 300 is equal to or lower than the predetermined level, the controller 900 turns off the sheath heater 700 or performs control such that an alarm signal is output. In addition, when the area of the sheath heater 700 that is exposed to air exceeds a predetermined level, the controller 900 turns off the sheath heater 700 or performs control such that an alarm signal is output, thereby preventing overheating of the sheath heater 700.

As is apparent from the above description, according to a coolant heating device for a vehicle in the present disclosure, when coolant leaks or when the area of a sheath heater that is exposed to air in a housing exceeds a predetermined level, it is possible to prevent overheating due to operation of the sheath heater. In addition, since air collected in the housing is easily discharged outside, damage to the sheath heater may be prevented, and the operational efficiency of the sheath heater may be improved. In addition, it is also possible to prevent malfunction of a water pump and a valve due to air.

Although the exemplary embodiment of the present disclosure has been disclosed for illustrative purposes, those skilled in the art will appreciate that various modifications, additions and substitutions are possible, without departing from the scope and spirit of the invention as disclosed in the accompanying claims.

What is claimed is:

1. A coolant heating device for a vehicle, comprising:
a housing storing coolant therein and having a sheath heater therein;
an upper space part protruding upwards from a top surface of the housing and having an inner space communicating with an inner space of the housing;
a water-level-sensing part provided inside the upper space part to sense a level of coolant in the housing; and
a controller for controlling operation of the sheath heater based on the level of coolant sensed by the water-level-sensing part,
wherein the upper space part includes,
a discharge passage at a top portion of the upper space part, the discharge passage extending laterally to enable the upper space part to communicate with an outside, and
a blocking member located in the discharge passage to selectively open or close the discharge passage, and
wherein the controller controls the blocking member to selectively open or close the discharge passage so that air collected in the upper space part is discharged to the outside through the discharge passage.

2. The coolant heating device according to claim 1, wherein the water-level-sensing part includes:
a water level sensor for sensing the level of coolant in the housing; and
a guide bar extending downwards from a top surface of the upper space part to guide upward/downward movement of the water level sensor and to prevent incorrect detection by the water level sensor due to sloshing of coolant in the housing.

3. The coolant heating device according to claim 1, further comprising:
a partition wall extending downwards from a top surface of the upper space part toward a region between the water-level-sensing part and the housing,
wherein the partition wall prevents incorrect detection by the water level sensor due to sloshing of coolant in the housing.

4. The coolant heating device according to claim 1, wherein the upper space part has a side surface connecting a top surface of the upper space part to the top surface of the housing, the side surface having a slope such that a cross-sectional area of the upper space part gradually increases in a downward direction, so that an effective area of the housing, in which air is collected, increases.

5. The coolant heating device according to claim 1, wherein the upper space part includes an air discharge part at a top portion of the upper space part, and
wherein the air discharge part is configured to be opened or closed to communicate with an outside in order to discharge air collected in the upper space part to the outside.

6. The coolant heating device according to claim 1, wherein, when the level of coolant sensed by the water-level-sensing part exceeds a predetermined level, the controller turns on the sheath heater, and
when the level of coolant sensed by the water-level-sensing part is equal to or lower than the predetermined level, the controller turns off the sheath heater or performs control such that an alarm signal is output.

7. The coolant heating device according to claim 1, wherein, when an area of the sheath heater that is exposed to air exceeds predetermined level, the controller turns off the sheath heater or performs control such that an alarm signal is output to prevent overheating of the sheath heater.

* * * * *